(12) United States Patent
Maier

(10) Patent No.: US 6,712,563 B2
(45) Date of Patent: Mar. 30, 2004

(54) INDEXABLE INSERT FOR TURNING

(75) Inventor: Hans Maier, Pflach (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 0 days.

(21) Appl. No.: 09/963,009

(22) Filed: Sep. 25, 2001

(65) Prior Publication Data

US 2002/0061235 A1 May 23, 2002

(30) Foreign Application Priority Data

Sep. 25, 2000 (AU) .......................... A 704/2000

(51) Int. Cl.[7] .................. B23B 27/16; B23P 15/28
(52) U.S. Cl. ...................... 407/113; 407/114
(58) Field of Search .................. 407/113, 114, 407/115, 116

(56) References Cited

U.S. PATENT DOCUMENTS

| | | | | | |
|---|---|---|---|---|---|
| 3,395,434 | A | * | 8/1968 | Wirfelt | 407/114 |
| 4,359,300 | A | * | 11/1982 | Hazra et al. | 407/114 |
| 4,993,892 | A | * | 2/1991 | Takahashi | 407/114 |
| 5,006,020 | A | * | 4/1991 | Roos | 407/113 |
| 5,044,839 | A | * | 9/1991 | Takahashi | 407/114 |
| 5,456,557 | A | * | 10/1995 | Bernadic et al. | 407/114 |
| 5,584,616 | A | * | 12/1996 | Katbi et al. | 407/114 |
| 5,951,215 | A | * | 9/1999 | Paya et al. | 407/113 |
| 6,099,209 | A | * | 8/2000 | Murray et al. | 407/1 |
| 6,135,677 | A | * | 10/2000 | Fijimoto et al. | 407/42 |
| 2002/0136611 | A1 | * | 9/2002 | Hartlohner | 407/114 |

FOREIGN PATENT DOCUMENTS

| | | |
|---|---|---|
| EP | 0 133 168 A1 | 2/1985 |
| EP | 0 962 272 A1 | 12/1999 |
| FR | 1.260.357 | 3/1961 |
| JP | 60-99512 | * 5/1985 |
| JP | 60-135104 | * 7/1985 |

* cited by examiner

*Primary Examiner*—Daniel W. Howell
*Assistant Examiner*—Brian D. Walsh
(74) *Attorney, Agent, or Firm*—Laurence A. Greenberg; Werner H. Stemer; Gregory L. Mayback

(57) ABSTRACT

The indexable cutting insert for turning is formed with a plurality of main cutting edges. Adjacent main cutting edges, which enclose an angle with one another, are connected via a cutting corner. The cutting corner has two corner sections arranged symmetrically to a bisector of the angle. The corner sections, in the region of the angle bisector, have a depression with respect to the adjacent outer contours. Compared with conventional indexable inserts, the number of corner sections that can be used independently of one another is doubled.

5 Claims, 2 Drawing Sheets

INDEXABLE INSERT FOR TURNING

BACKGROUND OF THE INVENTION

Field of the Invention

The invention lies in the mechanical arts and relates, more specifically, to an indexable cutting insert for turning, having a plurality of main cutting edges, adjacent main cutting edges, which enclose a corner angle with one another, being connected via a cutting corner which has two identical corner sections arranged symmetrically to the angle bisector.

In conventional indexable inserts, adjacent main cutting edges enclosing an angle with one another are generally connected to one another by a cutting corner having a single corner section in the form of a rounded corner portion or a finish cutting edge.

The term "rounded corner" portions is used in the context of indexable inserts to designate such corner designs in which the cutting corners are defined with arcs of a circle having radii which, in the most common indexable inserts, depending on the size of the indexable insert, lie within a range of between 0.4 and 2.4 mm. In indexable inserts with finish cutting edges, with which an improved surface quality is achieved, the cutting corners are formed as arcs of a circle whose radii, in approximation to a straight line, are many times larger than in the case of rounded corner portions.

In addition, indexable inserts in which each cutting corner consists of two identical corner sections are known for special applications. Such an indexable insert is described, for example, in published French patent application FR 1 260 357. In the indexable insert according to that specification, the adjacent main cutting edges are connected to one another by two equally long, approximately straight corner sections which enclose an obtuse angle with one another and are arranged symmetrically to the angle bisector. On the one hand, by such a configuration, the cutting corners of the indexable insert are reinforced. On the other hand, smoothing of the surface, which was previously machined by the main cutting edge and the leading corner section, is the to be achieved by the trailing second corner section. In that indexable insert, although each cutting corner consists of two identical corner sections, both adjacent corner sections always come into use simultaneously during a cutting operation and are subjected to wearing stress in one and the same work operation.

SUMMARY OF THE INVENTION

It is accordingly an object of the invention to provide an indexable cutting insert, which overcomes the above-mentioned disadvantages of the heretofore-known devices and methods of this general type and which has two identical cutting sections that are arranged symmetrically to the angle bisector and can be used independently of one another, and as a result of which better efficiency of the indexable insert is achieved.

With the foregoing and other objects in view there is provided, in accordance with the invention, an indexable insert for turning, comprising an insert body formed with a plurality of main cutting edges including adjacent main cutting edges enclosing a corner angle with one another and defining an angle bisector, a cutting corner connecting the main cutting edges, the cutting corner being formed with two mutually identical corner sections arranged symmetrically with regard to the angle bisector and defining an outer contour, and having a depression formed with respect to the adjacent outer contour directly at the angle bisector.

In accordance with an added feature of the invention, the corner sections are rounded corner portions.

In accordance with a concomitant feature of the invention, the corner sections are configured as finish cutting edges.

In other words, the objects of the invention are achieved in that the corner sections, in their region directly adjoining the angle bisector, have a depression with respect to the adjacent outer contours.

This special configuration can be realized in all the important shapes of indexable inserts, such as square, triangular, rectangular and rhombic shapes.

With the configuration according to the invention of the indexable insert, in each case adjacent corner sections are designed to be separate from one another. By suitable selection of the setting angle of the indexable inserts, this achieves the effect that, during a cutting operation with uniform cutting direction, in addition to the main cutting edge just in use, in each case only the adjoining corner section participates in the cutting, whereas the second corner section is completely released and is not subjected to any wear. The second unworn corner section, with its adjacent main cutting edge, does not come into use until the cutting direction is changed, e.g. from longitudinal turning to the left to longitudinal turning to the right, or from longitudinal turning to facing, whereas the corner section used beforehand, with its adjacent main cutting edge, is released. Depending on the geometry of the indexable insert and the type of change of the cutting direction, a change in the setting angle of the indexable insert may be necessary for this purpose.

In this way, at each indexable insert, the corner sections which can be used independently of one another are doubled and the efficiency is thus increased.

Thus, for example, in negative square indexable inserts, up to 16 cutting-edge regions which can be used independently of one another can be provided, whereby optimum utilization of the indexable inserts is achieved. Here, in each case a corner section with associated main cutting edge is to be regarded as the cutting-edge region.

Since the cutting-edge region which is in use during the cutting does not extend directly up to the angle bisector between the two corner sections, it is possible to bring the central seating surface of the indexable inserts in the region of each angle bisector directly up to the outer edges of the indexable insert. This results in optimum seating of the indexable insert without the cutting insert tilting up even under very high loading.

Of course, the advantages of the indexable insert according to the invention are only completely effective when the indexable insert is used in cutting operations having different cutting directions, which, however, is the case in many machining operations.

Other features which are considered as characteristic for the invention are set forth in the appended claims.

Although the invention is illustrated and described herein as embodied in an indexable cutting insert for turning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
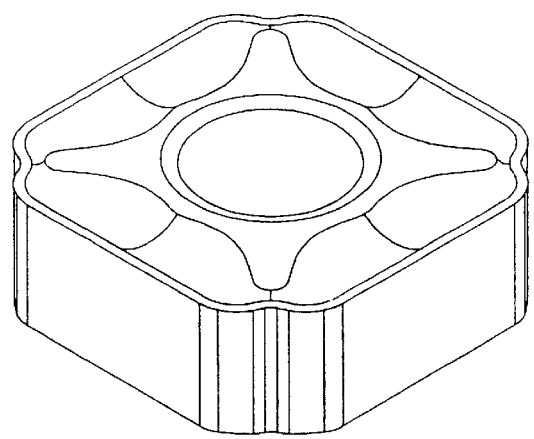
FIG. 1 is a perspective view of an indexable insert according to the invention.
Figure 2:
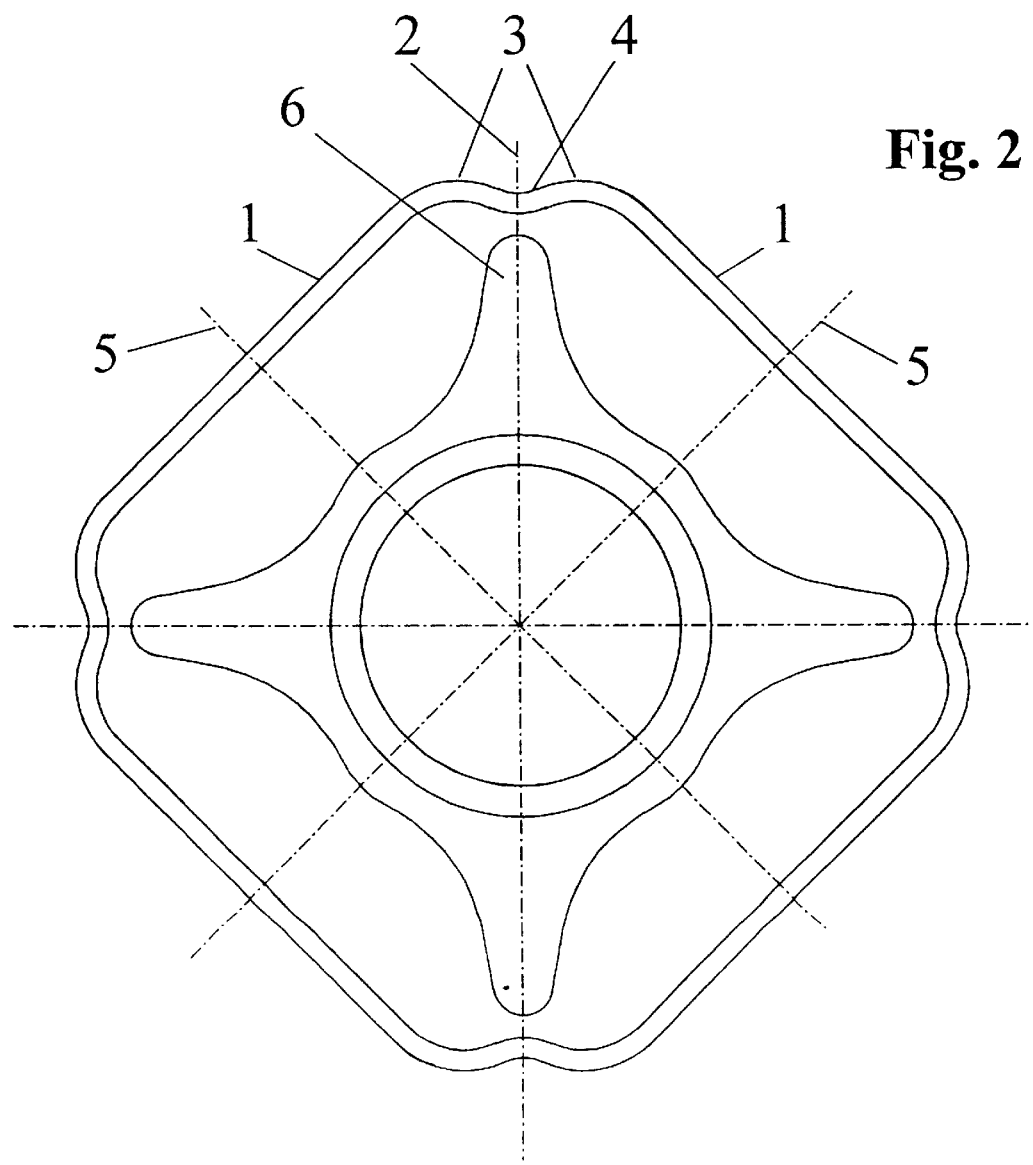
FIG. 2 is an enlarged top plan view of the indexable insert according to the invention illustrated in FIG. 1.

Referring now to the figures of the drawing in detail and first, particularly, to FIGS. 1 and 2 thereof, there is shown show an indexable insert according to the invention in a square shape configuration. Two adjacent main cutting edges 1 enclose an angle of 90° with one another. Two corner sections 3 which are formed as rounded corner portions are arranged symmetrically to the respectively associated angle bisector 2, are connected to one another and merge smoothly into the adjacent main cutting edges 1. In the region of the angle bisector, the corner sections 3 have a depression 4 with respect to the outer contours. The indexable insert is designed as a negative plate insert with 16 cutting-edge regions that can be used independently of one another, the corner section 3, formed as a rounded corner portion, up to the start of the depression 4, including the associated main cutting edge 1 up to the line 5 of symmetry of the indexable insert, being regarded as the cutting-edge region in each case. Owing to the fact that, during the cutting, the cutting-edge region is in use only up to the start of the depression 4 and not right up to the angle bisector 2, the seating surface 6 of the indexable insert in the region of the angle bisector 2 can be brought directly up to the outer contour of the indexable insert, as a result of which stable seating of the indexable insert is made possible.

Figure 3:
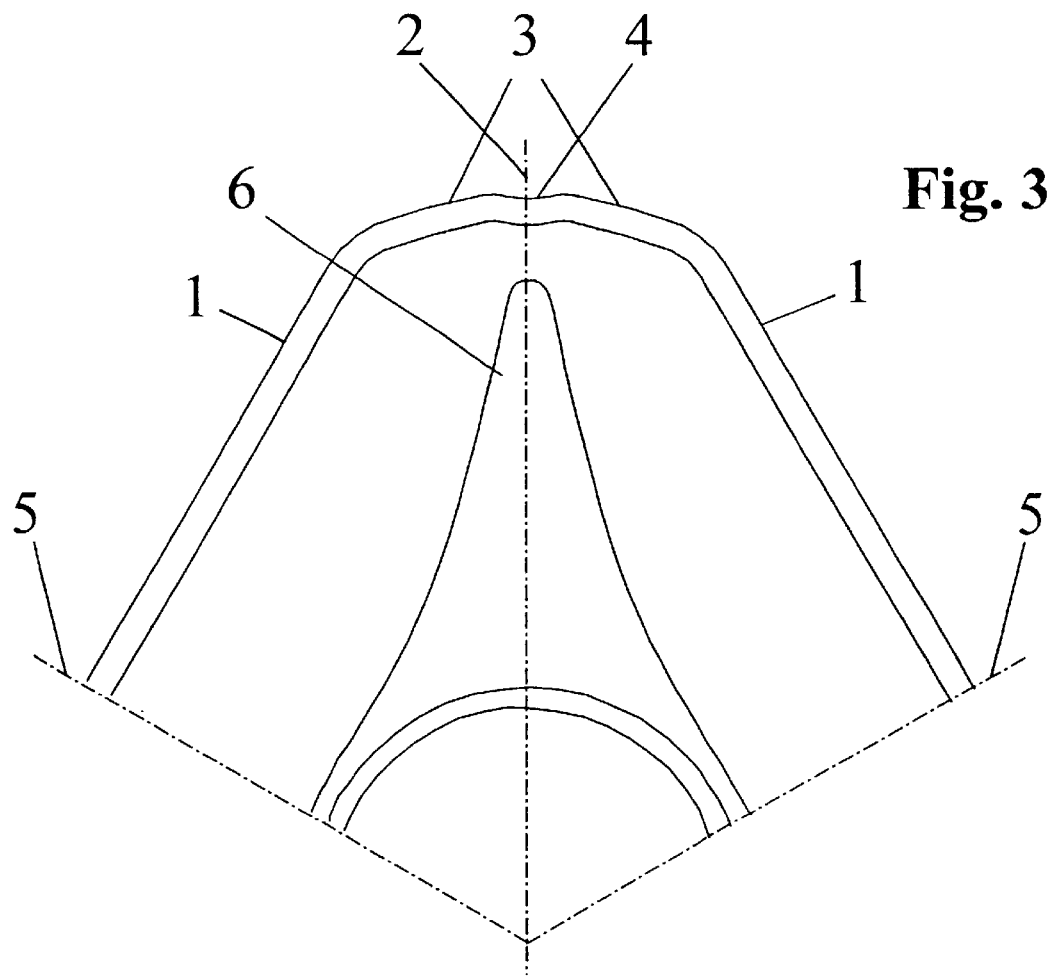
FIG. 3 is a plan view of an enlarged corner configuration according to an alternative embodiment of the indexable insert according to the invention.

The further enlarged view of FIG. 3 shows a cutting corner of an essentially triangular indexable insert according to the invention. Here, the corner sections 3 are not formed as rounded corner portions but as finish cutting edges with comparatively substantially larger radii in approximation to a straight line. The radial distance of the depression 4 from a rotational center of the cutting insert is less than the radial distance of the immediately adjacent contour of the corner sections 3.

Figures 4A, 4B:
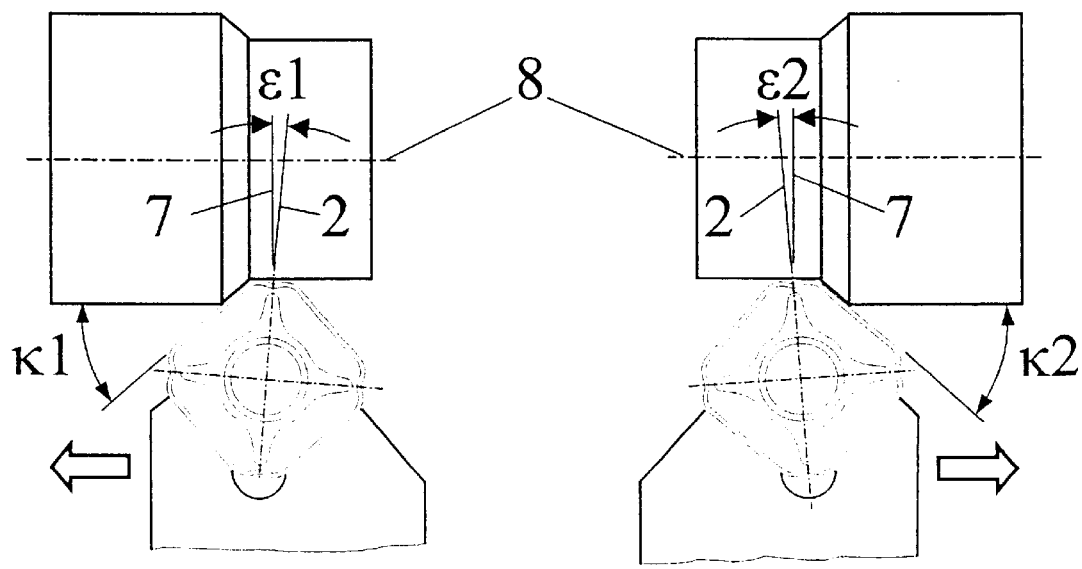
FIGS. 4a to 4b are partly diagrammatic plan views of the indexable insert according FIGS. 1 and 2 in different working positions.

In order to specifically bring only one cutting-edge region into use in each case during the cutting, the setting angle provided during the cutting must be specifically matched to the geometry of the indexable insert used and to the cutting direction in order to release the respectively adjacent cutting-edge region. FIGS. 4a to 4b show the first embodiment of the indexable insert according to the invention (FIGS. 1 and 2) during longitudinal turning to the left and right. During longitudinal turning to the left, the setting angle $\kappa 1$ between the left-hand main cutting edge and the workpiece surface is set, for example, in such a way that the angle bisector 2 is inclined to the right with respect to the plane 7 perpendicular to the workpiece axis 8 and encloses an angle $\epsilon 1$ of about 5° with the plane 8. During longitudinal turning to the right, the setting angle $\kappa 2$ between the right-hand main cutting edge and the workpiece surface is set in such a way that the angle bisector 2 is inclined to the left with respect to the plane 7 and encloses an angle $\epsilon 2$ of about 5° with the latter.

I claim:

1. An indexable insert for turning, comprising an insert body formed with a plurality of main cutting edges including adjacent main cutting edges enclosing a corner angle with one another and defining an angle bisector, a cutting corner connecting said main cutting edges, said cutting corner being formed with a cutting edge having two mutually identical corner sections arranged symmetrically with regard to said angle bisector and defining an outer contour, and said cutting edge having a depression formed with respect to the adjacent outer contour directly at said angle bisector.

2. The indexable insert for turning according to claim 1, wherein said corner sections are rounded corner portions.

3. The indexable insert for turning according to claim 1, wherein said corner sections are configured as finish cutting edges.

4. An indexable cutting insert, comprising an insert body having a rotational center and a plurality of main cutting edges including adjacent main cutting edges enclosing a corner angle with one another and defining an angle bisector, a cutting corner formed with a cutting edge symmetrically through said angle bisector between said adjacent main cutting edges, said corner angle cutting edge having two substantially identical corner sections defining an outer contour with a radial distance from said rotational center and a depression formed in said cutting edge between said corner sections at a radial distance from said rotational center less than said radial distance of said corner sections.

5. The indexable insert for turning according to claim 1, wherein said depression is a concave indentation in a plan view contour of said insert body.

* * * * *

UNITED STATES PATENT AND TRADEMARK OFFICE
CERTIFICATE OF CORRECTION

PATENT NO. : 6,712,563 B2
DATED : March 30, 2004
INVENTOR(S) : Han Maier

It is certified that error appears in the above-identified patent and that said Letters Patent is hereby corrected as shown below:

Title page,
Item [30], Foreign Application Priority Data, should read as follows:
-- Sep. 25, 2000   (AT       .................... A 704/2000 --

Signed and Sealed this

Twenty-fifth Day of May, 2004

JON W. DUDAS
*Acting Director of the United States Patent and Trademark Office*